United States Patent
Asada

(10) Patent No.: US 9,983,404 B2
(45) Date of Patent: May 29, 2018

(54) LIGHT DEFLECTING DEVICE

(71) Applicant: HOKUYO AUTOMATIC CO., LTD., Osaka-shi, Osaka (JP)

(72) Inventor: Norihiro Asada, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 0 days. days.

(21) Appl. No.: 15/505,492

(22) PCT Filed: Mar. 3, 2016

(86) PCT No.: PCT/JP2016/056523
§ 371 (c)(1),
(2) Date: Feb. 21, 2017

(87) PCT Pub. No.: WO2017/149713
PCT Pub. Date: Sep. 8, 2017

(65) Prior Publication Data
US 2017/0343794 A1    Nov. 30, 2017

(51) Int. Cl.
*G02B 26/08* (2006.01)
*G02B 26/10* (2006.01)

(52) U.S. Cl.
CPC ......... *G02B 26/085* (2013.01); *G02B 26/105* (2013.01)

(58) Field of Classification Search
CPC ...... G02B 26/08; G02B 26/085; G02B 26/10; G02B 26/105; G02B 26/0833; G02B 26/101; G02B 26/104; G02B 7/1821; B81B 2201/042

USPC .......................................... 359/224.1–226.1
See application file for complete search history.

(56) References Cited

U.S. PATENT DOCUMENTS

| | | | | |
|---|---|---|---|---|
| 6,972,890 B2* | 12/2005 | Matsui | ................ | G02B 26/085 |
| | | | | 359/224.1 |
| 7,256,926 B2* | 8/2007 | Kamiya | ............. | G02B 26/0833 |
| | | | | 359/224.1 |

FOREIGN PATENT DOCUMENTS

| | | |
|---|---|---|
| JP | H09-93901 A | 4/1997 |
| JP | 2008-298857 A | 12/2008 |

* cited by examiner

*Primary Examiner* — Euncha Cherry
(74) *Attorney, Agent, or Firm* — Oliff PLC

(57) ABSTRACT

A light deflecting device which suppresses a vibration caused by swing of a light deflecting unit and transmitted to a fixed unit and prevents noise from being made on a housing to which the fixed unit is attached, including a light deflecting unit having paired beams on both sides of a movable unit having a light reflecting unit and a coil, and a fixed unit to which the light deflecting unit is swingably fixed through the beams and which includes a magnetic field forming unit, swings the movable unit with the beams as torsional rotation axes by an electromagnetic force generated by a driving current flowing to the coil and a magnetic field formed by the magnetic field forming unit, and a counter swing member in the fixed unit to be swung in a reverse phase to the light deflecting unit so it is opposed to the light deflecting unit.

11 Claims, 12 Drawing Sheets

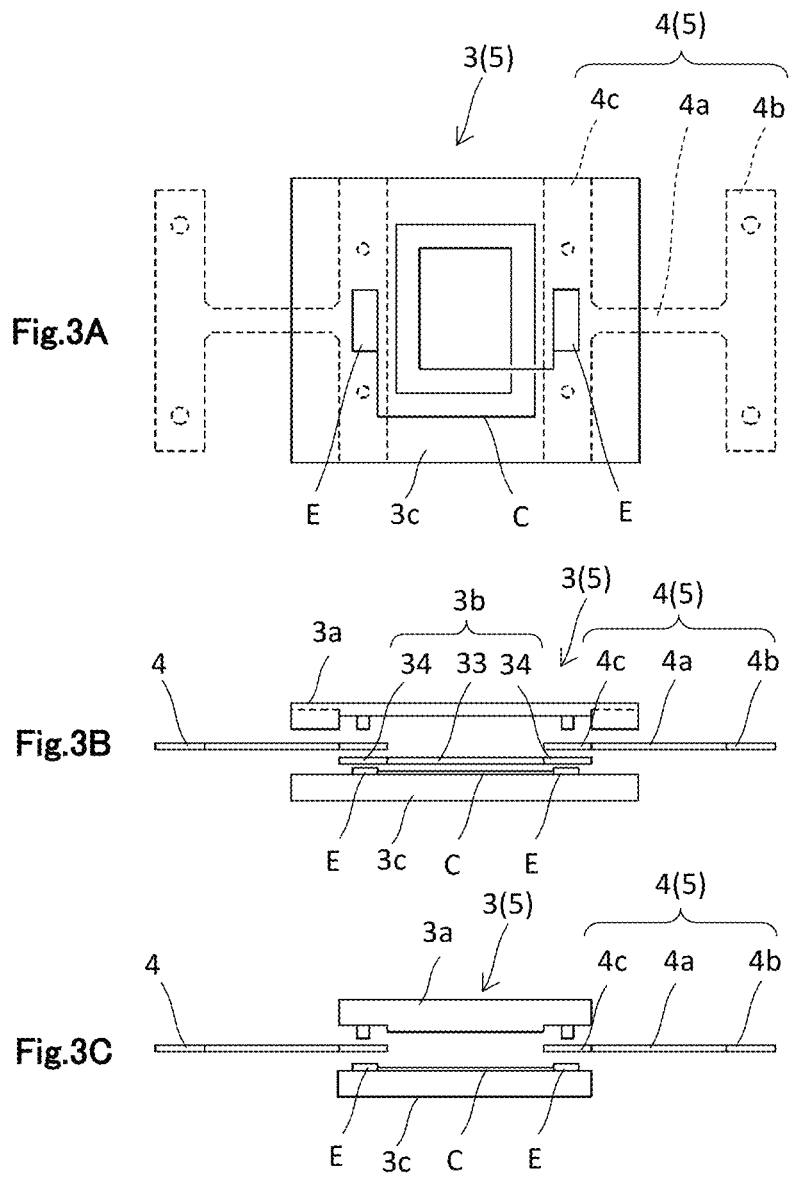

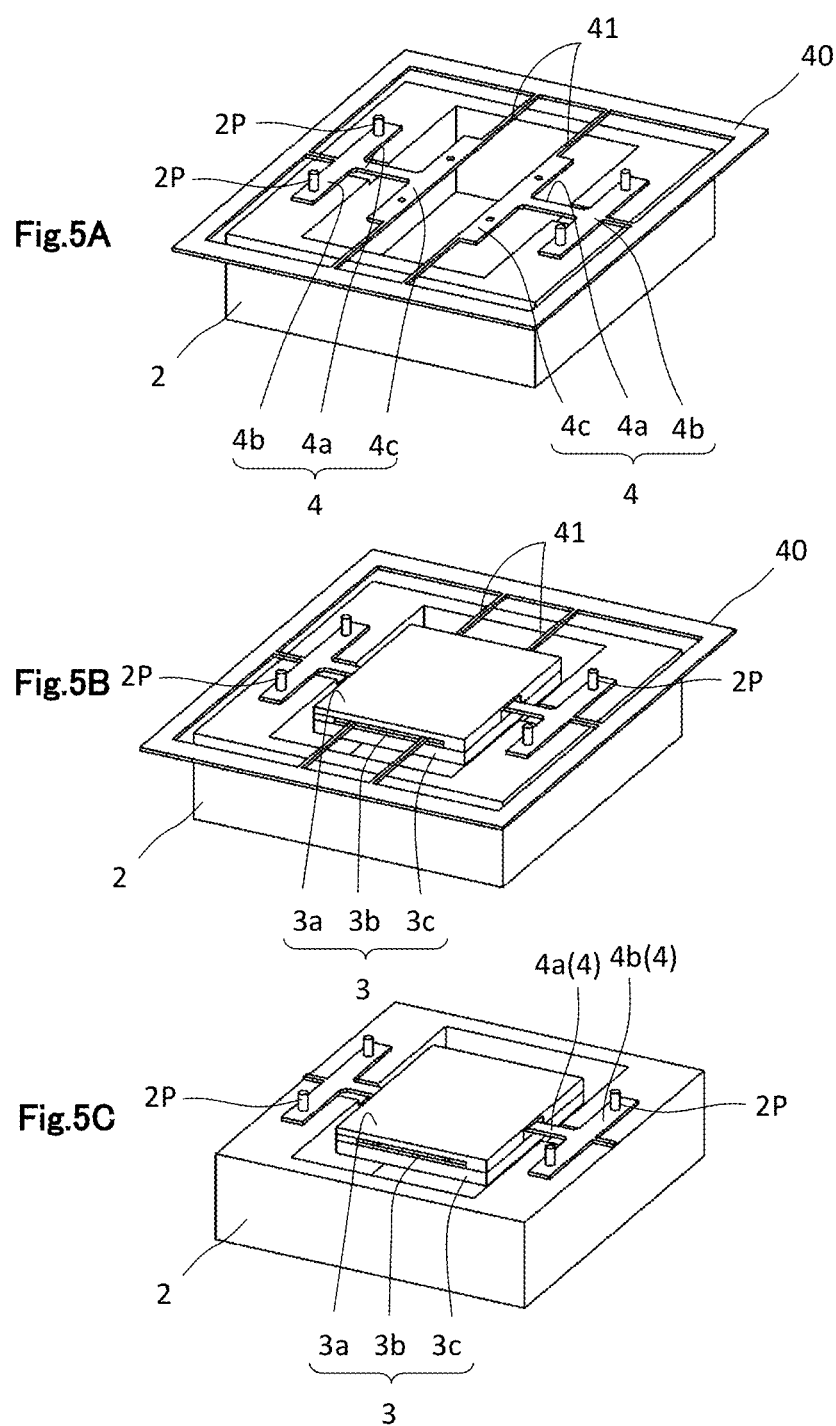

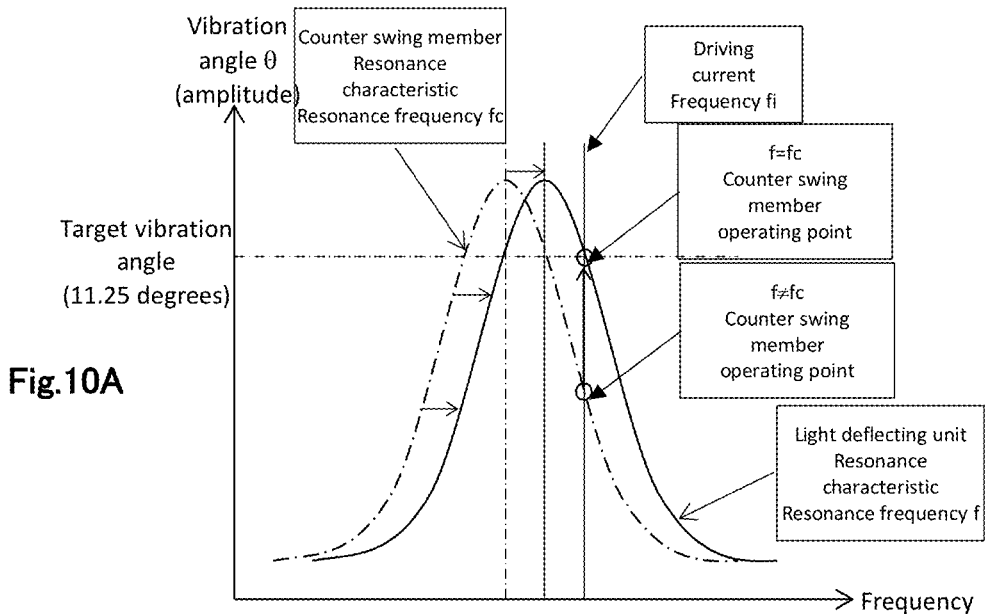
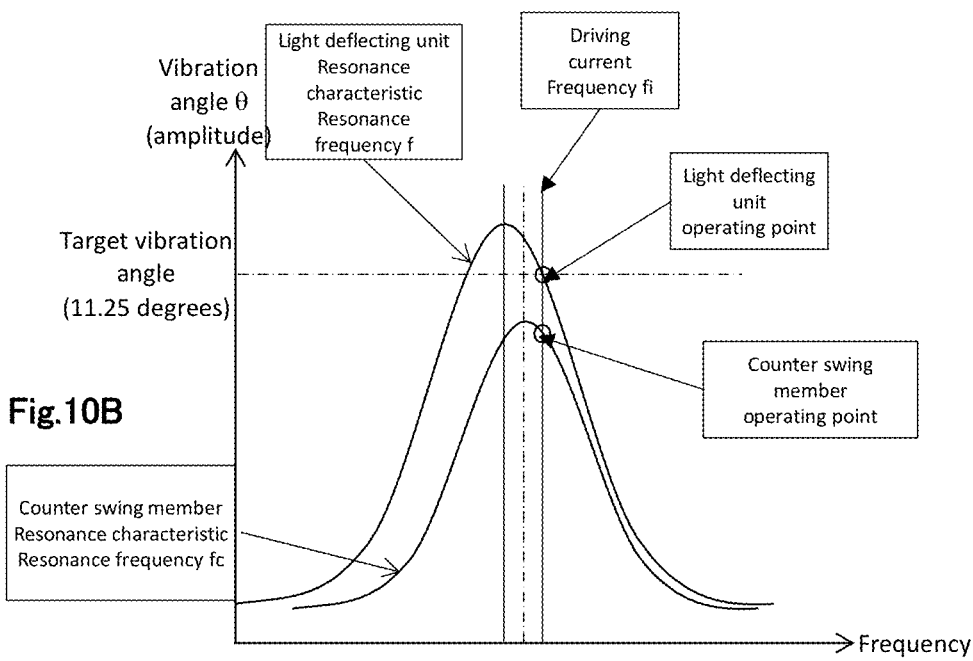

LIGHT DEFLECTING DEVICE

TECHNICAL FIELD

The present invention relates to a light deflecting device and more particularly to a light deflecting device including a light deflecting unit provided with paired beams on both sides of a movable unit having a light reflecting unit and a coil, and a fixed unit to which the light deflecting unit is swingably fixed through the beams and which has a magnetic field forming unit, and serving to swing the movable unit by using the beams as torsional rotation axes by an electromagnetic force generated by a current flowing to the coil and a magnetic field formed by the magnetic field forming unit.

BACKGROUND ART

The light deflecting device is a miniature machine manufactured by using the MEMS (Micro Electro Mechanical Systems) technology or the like and is used for a distance measuring device, a laser beam printer or the like.

Patent Document 1 discloses a resonant type swinging motor including a balancer provided with a permanent magnet and a yoke which form a magnetic gap, an operation object to which a magnetic field generating coil disposed in the magnetic gap is fixed, and a support base and having the operation object and the balancer connected to the support base so as to be freely resonated in order to provide a resonant type vibration motor for light deflection which is excellent in a vibration proof property.

The resonant type vibration motor for light deflection has a structure in which the balancer and the operation object are connected to the support base by using a leaf spring or the like, for example, and a driving force with equal magnitudes in opposite directions is generated between the operation object and the balancer by an interaction between a magnetic field of the coil and that of the permanent magnet when a driving current flows to the coil.

The operation object and the balancer reach resonant states having respective amplitudes and are subsequently maintained in the resonant states so that a vibration is prevented from being transmitted to a portion related to writing or reading of a light beam through a member connected to the support base. Thus, it is possible to obtain a vibration motor which is suitable for positioning with high precision.

Patent Document 2 proposes a scanner device in which a mirror is supported on a rotation shaft of a swing actuator device and is positioned around an axis of the rotation shaft in order to control a vibration of the mirror and to increase machining precision when follow-up controlling an angle of the mirror into a command value even if a reaction of a driving torque acts periodically from the swing actuator device, and which includes a support for supporting the swing actuator device and a dynamic vibration absorber having an equal natural vibration frequency to a resonance frequency of the support and has the dynamic vibration absorber fixed to the support.

PRIOR ART DOCUMENTS

Patent Documents

Patent Document 1: Japanese Laid-Open Patent Publication No. Hei 09-93901

Patent Document 2: Japanese Laid-Open Patent Publication No. 2008-298857

SUMMARY OF INVENTION

Problems to be Solved by the Invention

In a light deflecting device including a light deflecting unit provided with paired beams on both sides of a movable unit having the light reflecting unit and the coil and a fixed unit having the light deflecting unit fixed swingably through the beams and having a magnetic field forming unit, and serving to swing the movable unit with the beams set as torsional rotation axes, the light deflecting unit is swingably fixed to the fixed unit having the magnetic field forming unit through the beams. Therefore, it is impossible to employ the vibration proof structure disclosed in Patent Document 1.

For this reason, in the case where the vibration of the light deflecting unit is transmitted to a housing to which the fixed unit is attached through the fixed unit so that the housing side has a close resonance frequency to a driving frequency of the light deflecting unit, there is a problem in that the vibration is abnormally generated, resulting in a noise.

The scanner device disclosed in the Patent Document 2 serves to suppress the vibration of the mirror generated by an inertia force through the reactive force of the dynamic vibration absorber in the stoppage of the swing actuator device, thereby enhancing a responsiveness in the stoppage of the mirror, and does not have such a structure as to suppress a vibration which influences other structure members by means of the mirror to be swung and driven, for example.

In consideration of the problem, it is an object of the present invention to provide a light deflecting device which suppresses a vibration transmitted to a fixed unit which is caused by the swing of a light deflecting unit so that a noise is prevented from being made in a housing to which the fixed unit is to be attached.

Means for Solving the Problems

In order to achieve the object, according to a first characteristic structure of the light deflecting device in accordance with the present invention, as described in claim 1 of claims for patent, the light deflecting device includes a light deflecting unit having paired beams provided on both sides of a movable unit having a light reflecting unit and a coil, and a fixed unit to which the light deflecting unit is swingably fixed through the beams and which has a magnetic field forming unit, the movable unit being swung with the beams set as torsional rotation axes by an electromagnetic force generated by a driving current flowing to the coil and a magnetic field formed by the magnetic field forming unit, wherein a counter swing member to be swung in a reverse phase to a swing phase of the light deflecting unit is provided in the fixed unit so as to be opposed to the light deflecting unit.

The light deflecting unit is swingably fixed to the fixed unit through the beams and the counter swing member is disposed in the fixed unit so as to be opposed to the light deflecting unit. The counter swing member is swung in the reverse phase to the swing phase of the light deflecting unit so that an exciting force acting on the fixed unit by the light deflecting unit is offset by the exciting force of the counter swing member.

According to a second characteristic structure, as described in claim 2, the counter swing member is configured by a counter movable unit including a counter coil having a winding direction set to be reverse to the coil of the movable unit, and paired counter beams provided on both sides of the counter movable unit, and a driving current is applied to the counter coil in a reverse direction to a direction of the driving current to be applied to the coil in addition to the first characteristic structure.

The driving currents flowing respectively to the coil provided in the movable unit and the coil of the counter swing member disposed opposite to the light deflecting unit are set into reverse directions to each other, and the light deflecting unit and the counter swing member are swung and driven in reverse phases to each other. As a result, the exciting force acting on the fixed unit by the light deflecting unit is offset by the exciting force of the counter swing member. At this time, the light deflecting unit and the counter swing member can be swung and driven in reverse phases by a common driving current. If the resonance frequencies of the light deflecting unit and the counter swing member are coincident with each other, moreover, both of them are swung and driven in completely reverse phases.

According to a third characteristic structure, as described in claim 3, a resonance frequency of the light deflecting unit and the resonance frequency of the counter swing member are set to be coincident with each other or close to each other in addition to the second characteristic structure.

When the frequency of the driving current is set to be the resonance frequency of the light deflecting unit, that is, a natural frequency, a driving efficiency is maximized. However, the resonance frequency of the mechanical system is influenced by an ambient temperature and thus fluctuates greatly. In order to control an amplitude of the light deflecting unit to be constant regardless of the temperature fluctuation, it is necessary to always grasp a fluctuation in the resonance frequency. If this is not the case, controllability decreases. By shifting the frequency of the driving current and the resonance frequency of the light deflecting unit to perform driving with a driving current in a frequency range in which a driving efficiency is lower than a maximum efficiency to regulate a frequency or a current value of the driving current even if an ambient temperature fluctuates, for example, it is possible to control an amplitude easily and stably.

When the frequency of the driving current is equal to the resonance frequency of the light deflecting unit, a swing amplitude of the light deflecting unit is maximized so that the swing phase of the light deflecting unit has a phase delay of 90 degrees with respect to the driving current. If the frequency of the driving current is higher than the resonance frequency of the light deflecting unit, the swing amplitude is reduced so that the phase delay is larger than 90 degrees. To the contrary, if the frequency of the driving current is lower than the resonance frequency of the light deflecting unit, the swing amplitude is reduced so that the phase delay is smaller than 90 degrees.

If a resonance characteristic is identical to that of the light deflecting unit when the counter swing member is driven with a common driving current to that of the light deflecting unit, an amplitude characteristic and a phase shift are identical to those of the light deflecting unit except that a swing direction is inverted (a phase difference of 180 degrees) from the light deflecting unit because a winding direction of the counter coil is reverse to that of the coil of the movable unit. In other words, if the resonance characteristics of the light deflecting unit and the counter swing member are identical to each other and the resonance frequencies are coincident with each other, the light deflecting unit and the counter swing member are always swung with an equal amplitude in reverse phases.

As a result, the counter swing member is always driven in a reverse phase to the light deflecting unit so that the exciting forces acting on the light deflecting unit and the fixed unit of the counter swing member are stably offset from each other. When the light deflecting unit and the counter swing member are sufficiently close to each other even if their resonance characteristics are not identical to each other, moreover, the swing phases are maintained to be almost reverse phases. For this reason, the exciting forces acting on the fixed unit are almost offset from each other.

According to a fourth characteristic structure, as described in claim 4, the counter swing member is configured by a counter movable unit and paired counter beams provided on both sides of the counter movable unit, and is swung in an almost reverse phase to a swing phase of the light deflecting unit upon receipt of a stress acting on the fixed unit by swing of the light deflecting unit in addition to the first characteristic structure.

When the driving current flows to the coil of the movable unit provided in the light deflecting unit, the light deflecting unit is swung and driven with the beams set as torsional rotation axes. At this time, the counter swing member is swung at the swing frequency of the light deflecting unit upon receipt of a stress acting on the fixed unit by the swing of the light deflecting unit. When a relationship between the resonance frequency and the swing frequency in the counter swing member is set properly, the swing is performed with the swing phase of the light deflecting unit and that of the counter swing member reversed to each other and the exciting force acting on the fixed unit of the counter swing member acts in an offset direction from the exciting force acting on the fixed unit of the light deflecting unit.

According to a fifth characteristic structure, as described in claim 5, a frequency of the driving current is set to the vicinity of a resonance frequency of the light deflecting unit, and the resonance frequency of the counter swing member is set to be lower than the frequency of the driving current in addition to the fifth characteristic structure.

As described above, when the frequency of the driving current is set to be the resonance frequency of the light deflecting unit, the driving efficiency is maximized. However, the resonance frequency of a mechanical system is influenced greatly by an ambient temperature. In order to control the amplitude of the light deflecting unit to be constant regardless of a temperature fluctuation, it is necessary to always grasp a fluctuation in the resonance frequency. If this is not the case, controllability decreases. Also in that case, it is possible to perform stable swing driving by shifting the frequency of the driving current from the resonance frequency of the light deflecting unit.

When the frequency of the driving current is set to be a high region or a low region in the vicinity of the resonance frequency of the light deflecting unit so that the light deflecting unit is stably controlled into a constant amplitude by frequency variable control under a certain current value of the driving current, current value variable control under a certain frequency or the like, for example. The fixed unit is vibrated by the exciting force of the light deflecting unit to swing in accordance with the frequency of the driving current at this time so that the counter swing member is swung upon receipt of the reactive force of the vibration of the fixed unit.

If the resonance frequency of the counter swing member is equal to the frequency of the driving current, that is, the swing frequency of the light deflecting unit, the amplitude of the counter swing member is maximized so that the counter swing member is swung with a delay of 90 degrees from the swing phase of the light deflecting unit. If the resonance frequency of the counter swing member is lower than the swing frequency, the amplitude is reduced, while a delay from the swing phase of the light deflecting unit is greater than 90 degrees. If the resonance frequency of the counter swing member is higher than the swing frequency, the delay from the swing phase of the light deflecting unit is smaller than 90 degrees.

In other words, if the resonance frequency of the counter swing member is lower than the swing frequency, the phase delay from the swing phase of the light deflecting unit is equal to or greater than 90 degrees and the exciting force generated by the counter swing member acts in such a direction as to offset the exciting force of the light deflecting unit. On the other hand, if the resonance frequency of the counter swing member is higher than the swing frequency, the phase delay from the swing phase from the light deflecting unit is smaller than 90 degrees and the exciting force generated by the counter swing member does not act in such a direction as to offset the exciting force of the light deflecting unit.

According to a sixth characteristic structure, as described in claim 6, an opening portion facing the movable unit is formed on the counter movable unit, and a swing cycle of the light deflecting unit can be measured with the opening portion sandwiched, in addition to any of the first to fifth characteristic structures.

It is possible to measure the swing cycle of the light deflecting unit from a back surface of the light deflecting unit via an opening portion formed on the counter movable unit.

According to a seventh characteristic structure, as described in claim 7, the movable unit and/or the counter movable unit are/is provided with a mass regulating unit for regulating a resonance frequency in addition to any of the first to sixth characteristic structures.

When a variation in the resonance frequency of the light deflecting unit and/or the counter swing member is made in manufacture, it is hard to swing and drive the light deflecting unit and/or the counter swing member at a predetermined frequency with respect to the frequency of the driving current. Also in the case where the resonance frequency of the light deflecting unit and/or the counter swing member fluctuates due to a rise in a temperature in driving, moreover, the same problem is caused. In this case, if the movable unit and/or the counter movable unit are/is provided with a mass regulating unit, it is possible to properly drive the light deflecting unit and/or the counter swing member at a predetermined frequency with respect to a preset frequency of the driving current by suppressing a fluctuation caused by a variation in manufacture of the resonance frequency or a fluctuation caused by a change in a temperature.

In order to efficiently offset the exciting force of the light deflecting member through the counter swing member, it is necessary to set a relative relationship between the resonance frequency of the light deflecting member, and the resonance frequency of the counter swing member and the driving frequency of the driving current with high precision. By including the mass regulating unit, it is possible to regulate a relative variation in the resonance frequency in manufacture. Therefore, it is possible to enhance an offset effect of the exciting force.

According to an eighth characteristic structure, as described in claim 8, there is further provided a mass regulating unit configured to be able to swing integrally with the movable unit or the counter movable unit and capable of performing regulation from an outside with the movable unit or the counter movable unit sandwiched in addition to any of the first to sixth characteristic structures.

By employing such a structure as to enable the mass regulating unit to perform regulation from the outside with the movable unit or the counter movable unit sandwiched therebetween so as to be swung integrally with the movable unit or the counter movable unit, it is possible to then regulate a mass for the assembled light deflecting device.

According to a ninth characteristic structure, as described in claim 9, the mass regulating unit coarsely regulates a resonance frequency by increasing a mass and finely regulates the resonance frequency by decreasing the mass in addition to the seventh or eighth characteristic structure.

In the regulation of the resonance frequency, when the mass of the mass regulating unit is increased to perform coarse regulation and the mass of the mass regulating unit is decreased to perform fine regulation, a work for regulating the resonance frequency can be performed rapidly and accurately.

According to a tenth characteristic structure, as described in claim 10, the beam and the counter beam are molded to have a sectional area of 1 mm$^2$ or less by any of a focused ion beam method, an etching method and a plating method by using any of metals including a stainless material, a carbon tool steel material and a cold-reduced carbon steel sheet material which are rolled by the tension annealing method in addition to any of the first to ninth characteristic structures.

When the beam and the counter beam are processed by any of the focused ion beam method, the etching method and the plating method, there is greatly reduced a probability that such a scratch as to grow into a crack due to a stress amplitude might be formed on a surface. Consequently, there is extremely reduced a possibility that a fatigue strength might be reduced. When the molding is performed to have a sectional area of 1 mm$^2$ or less, a beam exhibiting a correspondingly excellent effective yield strength can be configured. By using any of metals including a stainless material, a carbon tool steel material and a cold-reduced carbon steel sheet material which are rolled by the tension annealing method to configure a metal elastic member, it is possible to obtain a beam which can be operated stably for a long period of time.

Effects of Invention

As described above, according to the present invention, it is possible to provide a light deflecting device which suppresses a vibration to be transmitted to the fixed unit which is caused by the swing of the light deflecting unit, thereby preventing a noise from being made over the housing to which the fixed unit is attached.

BRIEF DESCRIPTION OF DRAWINGS

FIG. 3A is a plan view showing a light deflecting unit, FIG. 3B is a sectional view showing the same, and FIG. 3C is a sectional view showing another embodiment of the light deflecting unit.

FIG. 5A, FIG. 5B and FIG. 5C are explanatory views showing a procedure for assembling the light deflecting device.

FIG. 10A is an explanatory chart showing a relationship between a driving frequency and the resonance frequencies of the light deflecting unit and the counter swing member in the case where both the light deflecting unit and the counter swing member are swung independently and FIG. 10B is an explanatory view showing a relationship between the driving frequency and the resonance frequencies of the light deflecting unit and the counter swing member in the case where the counter swing member is swung passively with respect to the light deflecting unit.

EMBODIMENTS FOR CARRYING OUT THE INVENTION

A specific example of a light deflecting device according to the present invention will be described below with reference to the drawings.

Figure 1:
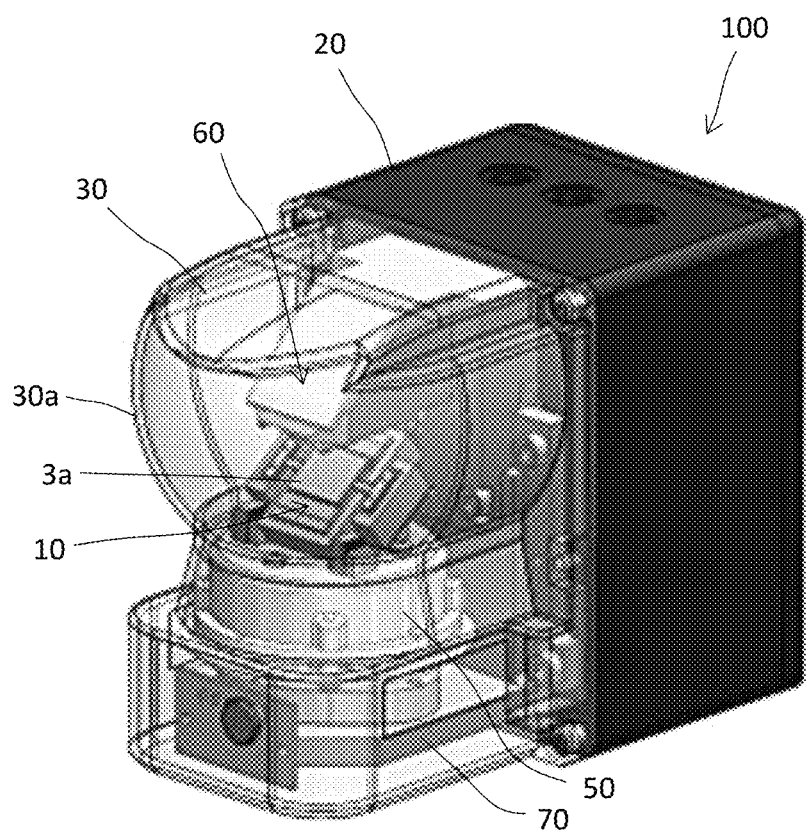
FIG. 1 is a perspective view showing a distance measuring device in which a light deflecting device according to the present invention is incorporated.

FIG. 1 shows a distance measuring device 100 in which a light deflecting device 10 being one example of miniature machine 1 is incorporated. A distance measuring device 100 includes a rectangular parallelepiped body casing 20 in which a power circuit or a signal processing circuit is accommodated, and a translucent optical device casing 30 which is disposed on one side surface of the body casing 20 and in which the light deflecting device 10 is rotatably accommodated.

An inner part of the optical device casing 30 accommodates a base 70, a rotary scanning unit 50 including an electromagnetic motor fixed to the base 40 and rotated around a vertical axial center, the light deflecting device 10 fixed to an upper part of the rotary scanning unit 50, a light projecting and receiving unit 60 having a light source using a laser diode or the like for projecting measurement light toward the light deflecting device 10 and a light receiving unit using a phototransistor and the like for receiving reflected light which is reflected by the light deflecting device 10.

Figure 2:
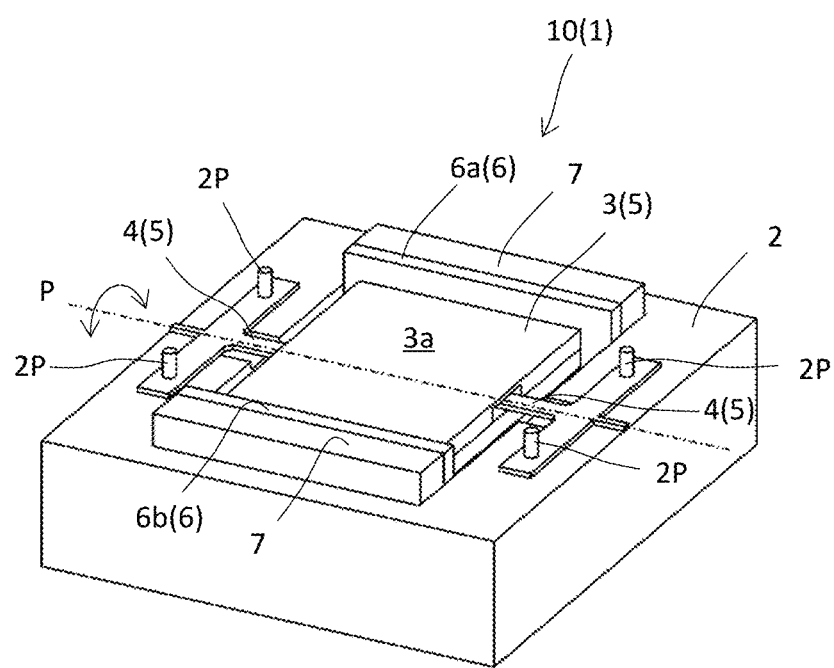
FIG. 2 is a perspective view showing a basic structure of the light deflecting device.

As shown in FIG. 2, the light deflecting device 10 includes a light deflecting unit 5 and a fixed unit 2. The light deflecting unit 5 includes a deflecting mirror 3a serving as a light reflecting unit at an upper surface side and is configured by a movable unit 3 having a coil on a back surface side and paired beams 4, 4 fixed to both sides of the movable unit 3.

The fixed unit 2 has a shape of a rectangular parallelepiped formed by a resin such as polycarbonate and has an opening space formed thereon. The opening space is hollowed out in a thickness direction to take a rectangular shape having a slightly larger area than the movable unit 3 as seen on a plane. The light deflecting unit 5 is fixed to paired opposite end portions with the opening space sandwiched therebetween so as to be swingable around an axial center P through the beams 4, 4.

Furthermore, a magnetic field forming unit 6 is disposed on the fixed unit 2 so as to sandwich the movable unit 3 at both sides. The magnetic field forming unit 6 is configured by paired permanent magnets 6a, 6b disposed opposite to each other in such a manner that one of them serves as the north pole and the other serves as the south pole, and each of the permanent magnets 6a, 6b is retained in a magnetic retainer 7 having high magnetic permeability.

As shown in FIG. 3A and FIG. 3B, the movable unit 3 includes a deflecting mirror 3a that is configured by a glass substrate or a silicon substrate with gold, aluminum, or the like deposited thereonto, a coil substrate 3c that is configured by a glass epoxy substrate with a copper coil C and electrode pads E printed thereon, and a spacer 3b that is also made of glass epoxy and is interposed therebetween.

The beams 4, 4 are configured by a metal elastic member and each of them includes a metal bar 4a having a predetermined length, a fixed unit pad 4b which is provided at a first end of the metal bar 4a and is fixed to the fixed unit 2, and a movable unit pad 4c which is provided at a second end of the metal bar 4a and is fixed to the movable unit 3.

The movable unit pads 4c of the paired beams 4, 4 are positioned so as to be in contact with the electrode pads E, respectively, and are bonded and fixed between the deflecting mirror 3a and the coil substrate 3c by a conductive adhesive agent. Alternatively, the coil substrate 3c may be configured by a multiple layered substrate having substrate layers that are made of an epoxy resin or the like and are provided respectively with coil patterns and coils coupled together by means of a via.

The spacer 3b has a central part formed by an insulating member 33 and both ends configured by a metal member 34. Each of the electrode pads E, E and each of the movable unit pads 4c, 4c are electrically connected to each other through metal members 34, 34.

In the case where the movable unit pads 4c are fixed to the vicinity of edge portions of the deflecting mirror 3a formed by an upper glass substrate and the coil substrate 3c formed by a lower glass epoxy substrate and the metal bar 4a is disposed so as not to be covered with the deflecting mirror 3a and the coil substrate 3c as shown in FIG. 3C, it is sufficient that a concave portion for accommodating the movable unit pad 4c is formed on the edge portion of the upper deflecting mirror 3a and a spacer 3b does not need to be provided.

As shown in FIG. 2, a positioning pin 2P provided on the fixed unit 2 is an electrode pin which is configured by a metal and serves to apply an alternating current to a coil C formed on the coil substrate 3c through the beams 4, 4.

When an alternating current is applied to the coil C through the paired beams 4, 4, Lorentz force acts on the coil C by the alternating current flowing to the coil C and a magnetic field formed by the permanent magnets 6a and 6b provided on the fixed unit 2 so that the movable unit 3 is repetitively swung as the beams set to be torsional axes by the Lorentz force. In the present embodiment, the movable unit 3 is swung by ±11.25°.

Returning to FIG. 1, when the rotary scanning unit 50 is rotated around the vertical axial center in this condition, measurement light emitted from the light source provided in the light projecting and receiving unit 60 is deflected by the deflecting mirror 3a and is subjected to rotary scanning from an optical window 30a toward a measuring target section. Then, reflected light from an object present in the measuring target section is incident on the deflecting mirror 3a from the optical window 30a and is deflected by the deflecting mirror 3a, and is received by the light receiving unit provided in the light projecting and receiving unit 60.

In other words, the measurement light is subjected to the rotary scanning around the vertical axial center by means of the rotary scanning unit 50, and at the same time, is swung and scanned by ±22.5° in a vertical direction by means of the deflecting mirror 3a swung around the beams 4, 4 so that three-dimensional scanning is performed.

In a signal processing circuit provided in the body casing 20, a distance from the distance measuring device 100 to the object present in the measuring target space is calculated based on a time difference between an emission time of the measurement light from the light source and a detection time of the reflected light in the light receiving unit.

FIGS. 4A to 4E show a process for fabricating a metal elastic member constituting the beams 4, 4 by using an etching method. In the present example, an SUS304CSP-H tension annealing material is used for a base material.

Figure 4A:
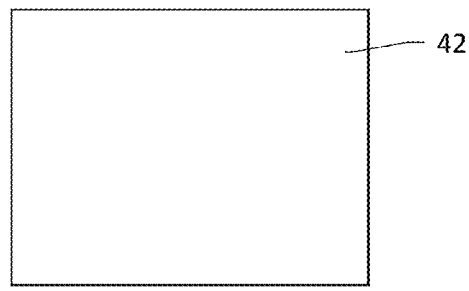
FIG. 4A to FIG. 4E are explanatory views showing a process for fabricating a beam.
Figure 4B:
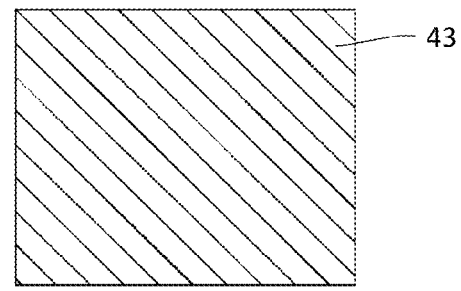
Figure 4C:
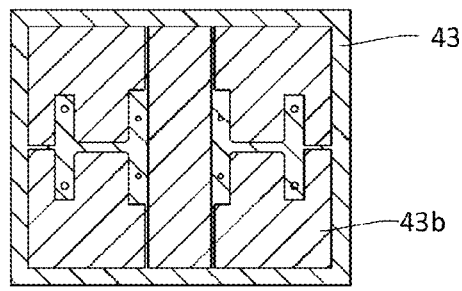

A photoresist 43 is uniformly applied onto a surface of a stainless thin plate 42 (see FIG. 4A) having a predetermined thickness (0.2 mm in the present embodiment) (see FIG. 4B) and light exposure is carried out through a photomask (not shown) formed in such a manner that regions corresponding to the metal bar 4a, the fixed unit pad 4b, the movable unit pad 4c, the frame 40 and the support unit 41 are shielded (see FIG. 4C).

Figure 4D:
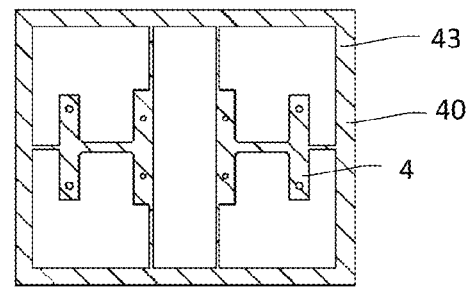

When a photoresist 43b in the exposed region is removed with a predetermined etchant, a photoresist 43 layer is formed in only regions corresponding to the frame 40 and the beams 4 in the surface of the stainless thin plate 42 (see FIG. 4D).

Then, an etchant for dissolving stainless is sprayed onto the surface of the stainless thin plate 42 to gradually progress etching treatment. When the etching treatment is completed, the photoresist 43 is removed with a solvent.

By the foregoing process, there can be formed a metal elastic member in which the paired metal bars 4a having the fixed unit pad 4b provided at the first end and the movable unit pad 4c provided at the second end are disposed symmetrically on a straight line in the frame 40, and the respective pads 4b and 4c are formed integrally so as to be fixed to the frame 40 through the support unit 41 (see FIG. 2E).

In the case where the metal elastic member is fabricated by using the plating method, there is created a mold frame having a predetermined depth in which the photoresist 43 shown in FIG. 2D takes a shape of a concave portion, a mold release agent is applied onto the mold frame and an electrolytic solution containing a metal ion is then filled therein to electrodeposit a metal in the electrolytic solution. Thus, the metal elastic member can be fabricated.

When the metal bar 4a constituting the beam 4 is formed by a mechanical processing method such as press working or cut working, concentration of a stress is caused by a stress amplitude in a plurality of minute scratches formed on the surface in the processing and a crack is thus grown with the minute scratches set as starting points. Consequently, a fatigue strength is reduced. Therefore, the movable unit 3 cannot be swung stably for a long period of time.

By fabrication through the etching method, the plating method, the focused ion beam method described above or the like, however, it is possible to implement the swingable beams 4, 4 stably for long period of time. As a material for the beams 4, 4, it is possible to use any of metals including a stainless material, a carbon tool steel material and a cold-reduced carbon steel sheet material which are rolled by the tension annealing method.

By molding the metal bar to have a sectional area of 1 mm$^2$ or less, it is possible to correspondingly constitute a beam exhibiting an excellent effective yield strength. Consequently, the movable unit 3 can be swung stably for a long period of time within a frequency of 150 Hz to 500 Hz. A swing angle of the deflecting mirror 3a constituting the movable unit 3 is not limited to be ±11.25° but has a value set properly depending on the intended use of the miniature machine 1.

Figure 4E:
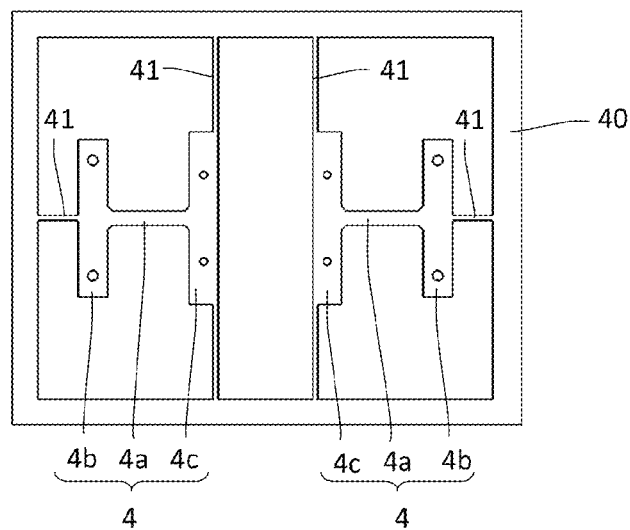

It is sufficient that the metal bar 4a constituting the beams 4, 4 shown in FIG. 4E is formed to have a sectional area of 1 mm$^2$ or less, and it is preferable that the metal bar 4a should be molded within a range of 0.001 mm$^2$ to 1 mm$^2$.

In the present embodiment, the metal bar 4a is formed to have a width W of 1.0 mm, a thickness T of 0.2 mm, a length L of 5 mm and a sectional area S of 0.20 mm$^2$. Each unit of the miniature machine 1 has a size as follows. The fixed unit 2 is formed to have a width of 23 mm, a depth of 26 mm and a thickness of 5.5 mm, and the movable unit 3 is formed to have a width of 12.0 mm, a depth of 12.0 mm and a thickness of 2.0 mm.

A frequency for driving to swing the movable unit 3, that is, a frequency of the alternating current to be applied to the coil C is preferably set to be a frequency which is slightly shifted from a mechanical resonance frequency of the beams 4, 4 including the movable unit 3, and can be set within a range of 50 Hz to approximately 1 kHz depending on a size of the movable unit 3, a sectional area and a length of the metal bar 4a, and a physical characteristic thereof.

For example, in the case where an area of a movable mirror is 12 mm×12 mm and the metal elastic member described above is used for the beams 4, a frequency range of 10 Hz to 1800 Hz, particularly, 150 Hz to 500 Hz is suitable.

Description will be given to a procedure for assembling the light deflecting device 10 by using the metal elastic member described above. As shown in FIG. 5A, paired positioning pins 2P provided on the fixed unit 2 are fitted, bonded and fixed into paired positioning hole portions formed on the respective fixed unit pads 4b.

As shown in FIG. 5B, next, paired positioning pins formed on a back surface of the deflecting mirror 3a are fitted from above paired positioning hole portions provided on the movable unit pad 4c, the spacer 3b is then put via the open space from below the movable unit pad 4c, the positioning pins of the deflecting mirror 3a are further fitted into paired positioning hole portions formed on the coil substrate 3c, and they are bonded and fixed with an adhesive agent, respectively.

As shown in FIG. 5C, each support unit 41 is cut so that the frame 40 is removed and the fixed unit pad 4b is fixed reliably. The movable unit 3 can be supported in a state in which the linearity of the torsional rotation axis configured by paired metal bars 4a is maintained with high accuracy. In addition, an assembling work can also be simplified. Thereafter, the magnetic field forming unit 6 is inserted from below and is thus fixed.

In the distance measuring device 100 having the light deflecting device 10 incorporated therein, there is a problem in that the vibration of the light deflecting unit 5 (3, 4) is transmitted to the body casing 20 or the optical device casing 30 through the rotary scanning unit 50 to which the fixed unit 2 is attached through the fixed unit 2 and the body casing 20 or the optical device casing 30 is resonated with the vibration to make a noise.

Figure 6A:
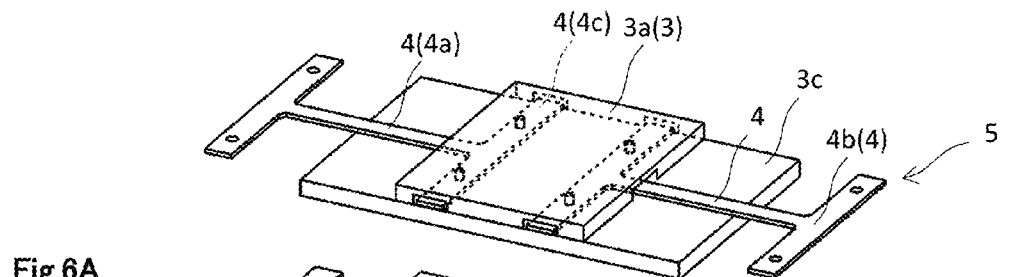
FIG. 6A is an explanatory view showing a light deflecting unit and a counter swing member (a counter light deflecting unit)
Figure 6B:
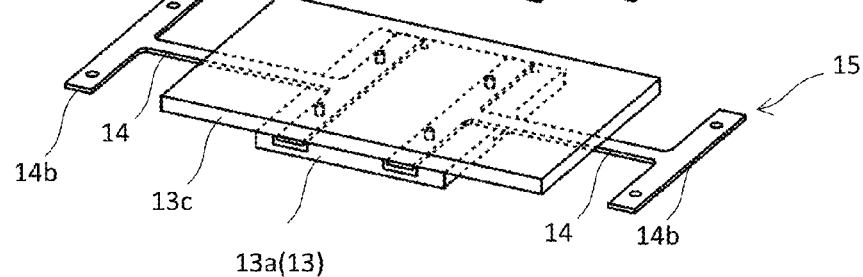
FIG. 6B is a sectional view showing the light deflecting unit and the counter swing member (the counter light deflecting unit) attached to the fixed unit.

As shown in FIGS. 6A and 6B, in the light deflecting device 10 according to the present invention, a counter swing member 15 to be swung in a reverse phase to the swing phase of the light deflecting unit 5 is swingably disposed in the fixed unit 2 so as to be opposed to the light deflecting unit 5. FIG. 6A shows only a state in which both the light deflecting unit 5 and the counter swing member 15 having a symmetrical shape with the light deflecting unit 5 are disposed so as to be opposed to each other.

Although the light deflecting unit 5 described with reference to FIGS. 2, 3 and 5 has such a structure that the deflecting mirror 3a and the coil substrate 3c have rectangular shapes with equal sizes to each other, the light deflecting unit 5 shown in FIGS. 6A and 6B is different from the deflecting mirror 3a formed to have a substantially square shape in that it is configured to have a rectangular shape in which a side in a direction along the beam 4 is longer than an orthogonal side to the beam 4 and that lengths of the beams 4, 4 are greater than those of the beams 4, 4 described with reference to FIGS. 2, 3 and 5, and they have the same basic structures.

In an example of FIG. 6B, the counter swing member 15 has a completely identical structure to the light deflecting unit 5, the coil substrates 3c and 13c are disposed symmetrically so as to be opposed to each other, and the magnetic field forming unit 6 is disposed so as to sandwich both the coil substrates 3c, 13c, which is not shown. When an alternating current is applied to the coil C formed on each of the coil substrates through the positioning pin 2P provided on the fixed unit 2, the light deflecting unit 5 and the counter swing member 15 are swung and driven in a phase difference of approximately 180°, that is, in an opposite direction.

As a result, an exciting force generated by action of the light deflecting unit 5 on the fixed unit 2 is offset by an exciting force generated by action of the counter swing member 15 on the fixed unit 2, and the vibration to be transmitted to the body casing 20 or the optical device casing 30 is attenuated so that occurrence of a noise is suppressed.

In other words, the counter swing member 15 is configured by the counter movable unit 13 including the counter coil and the paired counter beams 14 provided on both sides of the counter movable unit 13.

The same driving current as the driving current to be applied from the positioning pin 2P to the coil C of the light deflecting unit 5 via the beam 4 is applied from the positioning pin 2P to the counter coil of the counter light deflecting unit 15 via the counter beam 14. The coil C and the counter coil are wound symmetrically. Therefore, the driving currents to be applied to the coil C and the counter coil are applied in reverse directions to each other, and the light deflecting unit 5 and the counter light deflecting unit 15 are driven to be swung in reverse phases to each other.

FIG. 10A shows a relationship between a resonance frequency f of the light deflecting unit 5 and a frequency fi of the driving current. If the resonance frequency f of the light deflecting unit 5 is coincident with the frequency fi of the driving current, the light deflecting unit has a phase shifted by 90 degrees from the driving current and is thus swung at a maximum amplitude. If the frequency fi of the driving current is higher than the resonance frequency f of the light deflecting unit 5, the amplitude is reduced and the phase delay of the light deflecting unit 5 is greater than 90 degrees. If the frequency fi of the driving current is lower than the resonance frequency f of the light deflecting unit 5, the amplitude is similarly reduced and the phase delay of the light deflecting unit 5 is smaller than 90 degrees.

In the present example, in order to ensure the stability of an operation, the frequency fi of the driving current (which serves as a swing frequency) is set to have a different value from the resonance frequency f of the light deflecting unit 5 and driving is performed with a slightly smaller target amplitude than a maximum amplitude. When the resonance frequency fluctuates by a change in a temperature or the like, the swing amplitude is varied. For example, frequency variable control under a certain current value of the driving current, current value variable control under a certain frequency, and furthermore, variable control and the like for both the frequency and the current value are performed in such a manner that the swing angle of the light deflecting unit 5 is monitored by an optical sensor or the like so as to be maintained at a target swing angle, that is, a control angle.

If the counter swing member 15 has a completely identical structure to the light deflecting unit 5, currents in reverse rotations to each other flow to the coil c so that swing is performed at an equal amplitude at which a swinging direction is inverted. In other words, ideally, the counter swing member 15 and the light deflecting unit 5 are driven to be swung completely symmetrically including a temperature characteristic and exciting forces to be applied to the fixed unit 2 act in equally cancelling directions.

However, physical characteristics including the resonance frequency are not actually coincident perfectly with each other by the influence of an error, a variation in a characteristic or the like in manufacture. For this reason, the swing amplitude of the counter swing member 15 is not coincident with that of the light deflecting member so that the cancelling effect for the exciting force is decreased.

In the case where the mutual resonance characteristics are different from each other (fc≠f) due to a variation in characteristics of the counter swing member 15 and the light deflecting unit 5, the resonance frequency is monitored from an outside and is made equal to regulate the swing amplitude equally so that the exciting forces can be made equal and the cancelling effect can be maximized.

If a mechanism for regulating the resonance frequency is provided, it is possible to set the exciting forces to be cancelled through regulation after assembly by designing the structure in such a manner in advance that the resonance frequencies are close to each other even if the structure of the counter swing member is not completely identical to that of the light deflecting member.

If the driving currents of the counter swing member 15 and the light deflecting unit 5 have an identical driving frequency and can be controlled with different current values from each other, moreover, it is possible to control the amplitude so as to cancel the exciting forces more flexibly.

Although it is desirable that the resonance characteristics of the counter swing member 15 and the light deflecting unit 5 should be coincident with each other, a noise suppressing effect can be expected if the resonance frequencies are sufficiently close to each other.

Figure 7A:
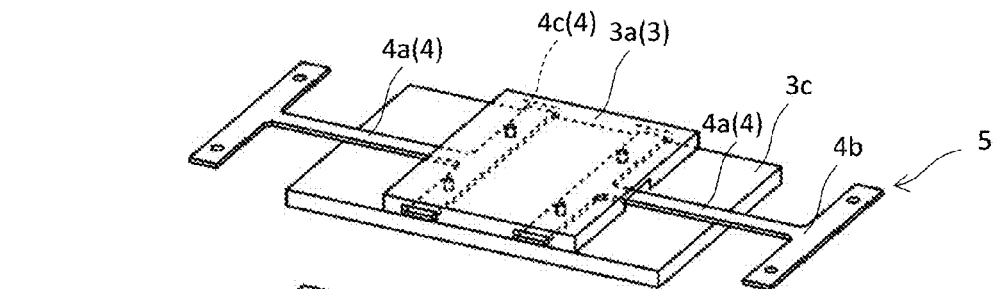
FIG. 7A is an explanatory view showing the light deflecting unit and the counter swing member.
Figure 7B:
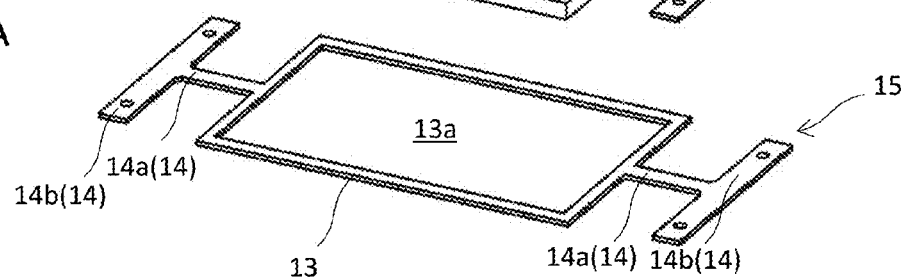
FIG. 7B is a sectional view showing the light deflecting unit and the counter swing member which are attached to the fixed unit.

FIGS. 7A and 7B show another embodiment of the counter swing member 15.

The counter swing member 15 includes the counter movable unit 13 and the paired counter beams 14, 14 provided on both sides of the counter movable unit 13, and is configured to be passively swung in an almost reverse phase to the swing phase of the light deflecting unit 5 upon receipt of a stress acting on the fixed unit 2 by the swing of the light deflecting unit 5.

Both the counter movable unit 13 and the counter beams 14, 14 are made by the same material as the beam 4 and are formed integrally by the etching method or the like described with reference to FIG. 4.

When the driving current flows to the coil of the movable unit 3 provided in the light deflecting unit 5, the light deflecting unit 5 is driven to be swung with the beam 4 set to be the torsional axis. At this time, when the resonance characteristic of the counter swing member 15 is properly set, the counter swing member 15 is swung in a reverse phase to the swing phase of the light deflecting unit 5 upon receipt of a stress acting on the fixed unit 2 by the swing of the light deflecting unit 5 so that the exciting forces acting on the light deflecting unit 5 and the fixed unit of the counter swing member 15 are offset or attenuated.

As shown in FIG. 10B, the frequency fi of the driving current is set to be the vicinity of the resonance frequency f of the light deflecting unit 5 (which is higher than the resonance frequency fin the present example) and is set to be higher than the resonance frequency fc of the counter swing member 15.

By setting the frequency fi of the driving current to the vicinity of the resonance frequency f of the light deflecting unit 5, it is possible to stably control the swing amplitude of the light deflecting unit 5 to be slightly lower than the maximum amplitude.

If the resonance frequency fc of the counter swing member 15 is equal to the frequency fi of the driving current, that is, the swing frequency of the light deflecting unit 5, the amplitude of the counter swing member 15 is maximized and is swung with a delay of 90 degrees from the swing phase of the light deflecting unit 5. If the resonance frequency of the counter swing member 15 is lower than the frequency of the driving current, the amplitude is reduced, while a delay from the swing phase of the light deflecting unit 5 is greater than 90 degrees. If the resonance frequency of the counter swing member 15 is higher than the frequency of the driving current, the delay from the swing phase of the light deflecting unit 5 is smaller than 90 degrees.

Therefore, the resonance frequency fc of the counter swing member 15 is set to be lower than the swing frequency fi of the light deflecting unit 5, that is, a closer value to the frequency fi of the driving current at the lower side of the frequency fi of the driving current. Consequently, the swing of the counter swing member 15 has a phase delay from the light deflecting unit 5 which is equal to or greater than 90 degrees, and acts in such a direction as to enable offset of an exciting force generated by the light deflecting unit 5.

On the other hand, when the frequency fi of the driving current is set to be lower than the resonance frequency fc of the counter swing member 15, the phase delay from the light deflecting unit of the counter swing member 15 is smaller than 90 degrees and does not act in such a direction as to offset the exciting force of the light deflecting unit 5.

It is desirable that the resonance frequency fc of the counter swing member 15 should be lower than the frequency fi of the driving current, have a phase delay of 90 degrees or more from the swing phase of the light deflecting unit 5 and be as close to fi as possible in order to increase the swing amplitude as greatly as possible. In other words, it is desirable that a deviation between the frequency fi of the driving current and the resonance frequency fc of the counter swing member 15 should be set to be a value which is equal to or smaller than 1 Hz, and equal to or smaller than 0.2 Hz, if possible.

In consideration of an actual manufacture variation or the like, it is extremely hard to stably set a deviation of the frequency of the counter swing member from the frequency fi of the driving current to be 1 Hz or less, desirably 0.2 Hz or less. For this reason, it is desirable that the light deflecting unit and the counter swing member should include a mass regulating unit for regulating the resonance frequency.

As shown in FIG. 7A, it is preferable to have a structure in which an opening portion 13a facing the movable unit 3 of the light deflecting unit 5 is formed on the counter movable unit 13 provided in the counter swing member 15 and a swing cycle of the light deflecting unit 5 can be measured with the opening portion 13a sandwiched.

For example, it is possible to measure the swing cycle by irradiating monitor light from below onto the coil substrate 3c formed into a mirror surface by depositing aluminum or the like on an upper surface of a glass epoxy substrate obtained by printing a copper coil C on a surface and detecting light reflected from the coil substrate 3c through a photosensor.

Figure 8:
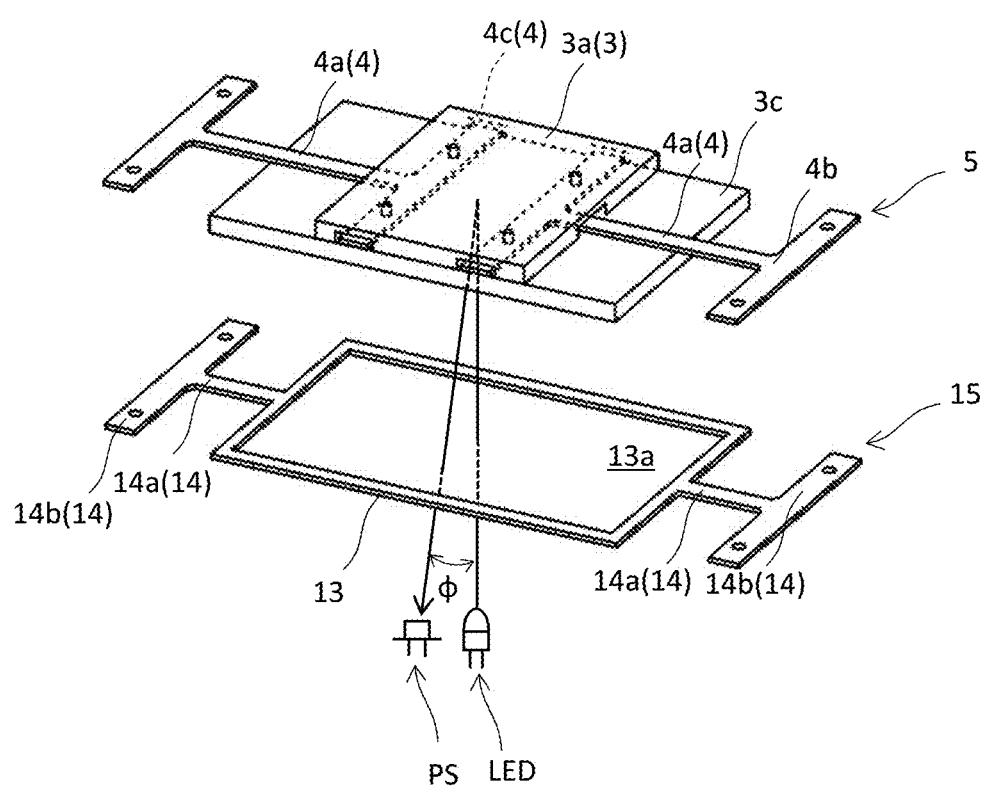
FIG. 8 is an explanatory view showing a swing angle detecting structure of the light deflecting unit.

As shown in FIG. 8, there are provided an LED for irradiating monitor light from below the opening portion 13a of the counter swing member 15 toward the coil substrate 3c of the light deflecting unit 5 and a photosensor PS for detecting the monitor light reflected by the coil substrate 3c, and it is possible to detect the swing cycle of the light deflecting unit 5 by calculating the cycle of the monitor light to be detected by the photosensor PS together with the swing of the light deflecting unit 5. For example, it is sufficient to provide the LED in such a manner that the monitor light is perpendicularly incident on a central part in a direction of the swing width of the coil substrate 3c in a stationary state and to provide the photosensor PS in a position inclined by a predetermined angle φ.

Also in the case where the counter swing member is provided with the coil and the counter swing member is driven in a reverse phase to the light deflecting unit actively with respect to the driving current, it is possible to provide, on the counter swing member 15, an opening portion for measuring the swing cycle of the light deflecting unit by properly designing the shape of the coil substrate, or the like.

Although it is preferable that the resonance frequency of the light deflecting unit 5 or the counter swing member 15 should be set to be a target value in manufacture, a variation is actually made. For this reason, the movable unit 3 and/or the counter movable unit 13 are/is provided with the mass regulating unit 18 in order to regulate the resonance frequency after the manufacture.

Figure 6C:
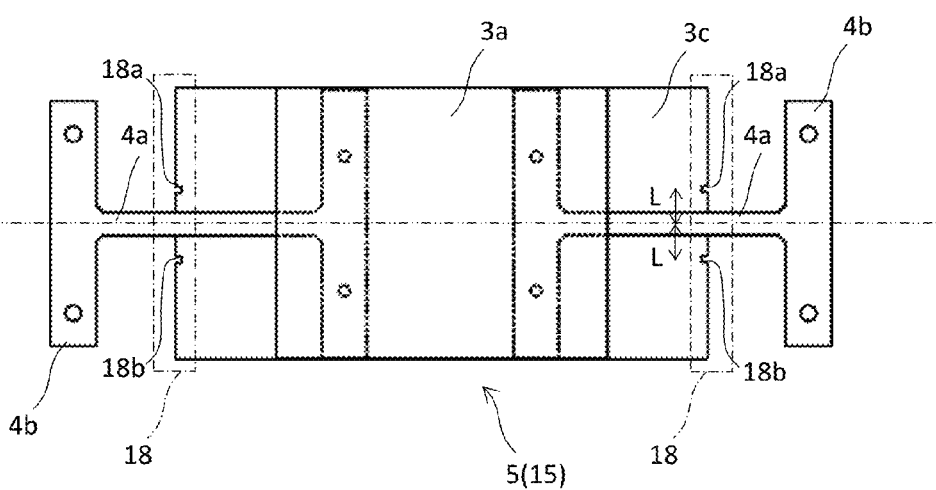
FIG. 6C is an explanatory view showing a mass regulating unit for regulating a resonance frequency of the light deflecting unit or the counter swing member (the counter light deflecting unit).

FIG. 6C shows an example in which the coil substrate 3c serving as the movable unit 3 is provided with the mass regulating unit 18. The mass regulating unit 18 is provided in an edge portion opposed to the fixed unit pad 4$b$ in the coil substrate 3$c$. The edge portions of the coil substrates 3$c$, 13$c$ are subjected to laser trimming to regulate a mass, for example, so that the resonance frequency is thus regulated into a target value. FIG. 6C shows an example in which laser trimming processing is performed in a size of 0.2 mm square in symmetrical positions 18$a$, 18$b$ placed apart from each other by a predetermined distance L at both sides with the beam set as a center axis.

Therefore, there is employed such a structure that the sizes of the coil substrates 3$c$, 13$c$ of the light deflecting unit 5 and/or the counter swing member 15 are set to be larger than the deflecting mirror 3$a$ and the coil substrates 3$c$, 13$c$ can be subjected to the laser trimming processing from above or below the fixed unit.

Figure 11A:
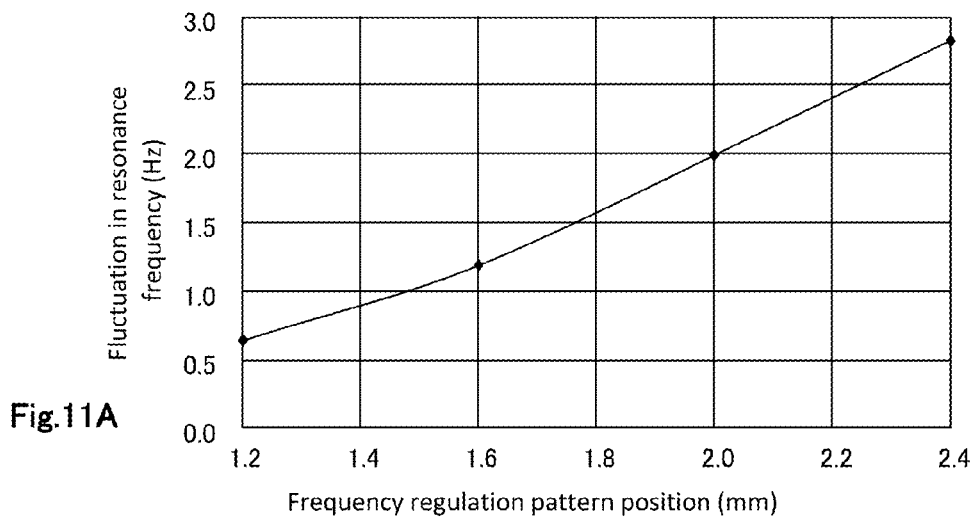
FIG. 11A is a fluctuation characteristic chart showing a frequency regulating pattern and a resonance frequency and FIG. 11B is a variation characteristic chart of a beam width and a resonance frequency.

FIG. 11A shows a regulation characteristic of the resonance frequency in the case where a position with a predetermined distance from the center axis is punched out in a size of 0.2 mm square with high accuracy by a laser processing machine or the like, for example, with respect to the coil substrate 3$c$ which has a size with a length (a long side) of 13 mm×a breadth (a short side) of 6 mm×a thickness of 0.5 mm and is formed by a glass epoxy resin, having a rectangular shape and six layers. This example shows that it is possible to regulate the resonance frequency with a linear characteristic by punching out any of a range of 1.6 mm to 2.4 mm from a swing rotation center axis. Accordingly, it is possible to previously grasp a processing position for performing the regulation to a target value. It is also possible to perform finer regulation by carrying out deep cutting into the coil substrate 3$c$ without punch-out.

In this example, the mass is reduced to increase the resonance frequency. To the contrary, it is also possible to decrease the resonance frequency by increasing the mass. For example, it is sufficient to add a weight to the mass regulating unit 18. It is possible to utilize a binder resin as the weight. By applying a binder resin measured by a dispenser onto a predetermined position with high accuracy by an ink jet type dispenser, for example, it is possible to regulate the resonance frequency.

However, it is hard to regulate a mass with high accuracy as in laser beam machining. For this reason, there is employed a structure in which the resonance frequency is coarsely regulated by an increase in the mass through the addition of a weight and the resonance frequency is finely regulated by a decrease in the mass through the laser beam machining or the like.

In the regulation of the resonance frequency, by increasing the mass of the mass regulating unit to perform coarse regulation and decreasing the mass of the mass regulating unit to perform fine regulation, it is possible to carry out the work for regulating the resonance frequency rapidly and accurately.

Figure 11B:
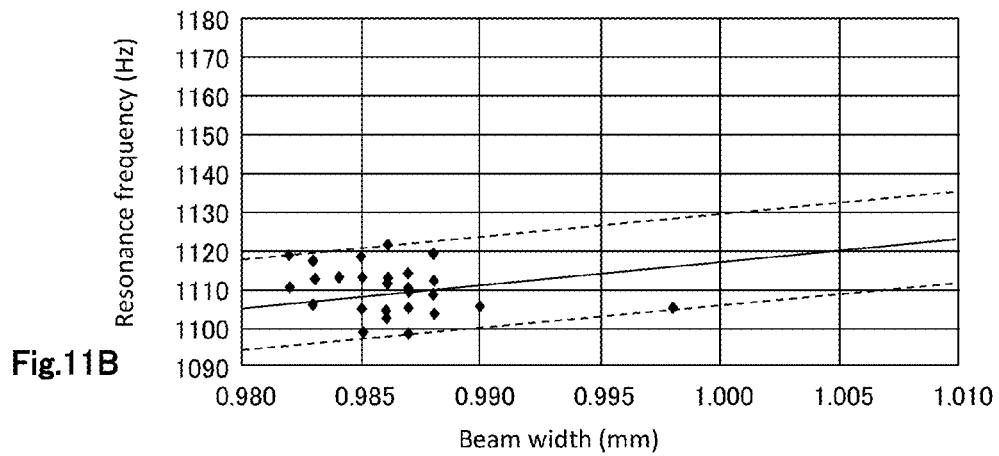
Figure 12A:
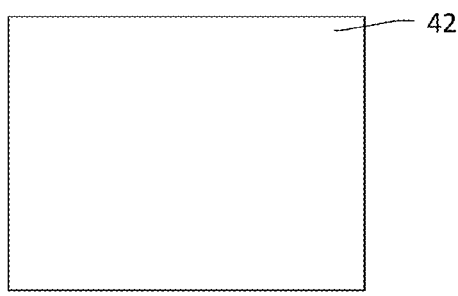
FIG. 12A to FIG. 12E are explanatory views showing a process for fabricating a beam, illustrating yet another embodiment.
Figure 12B:
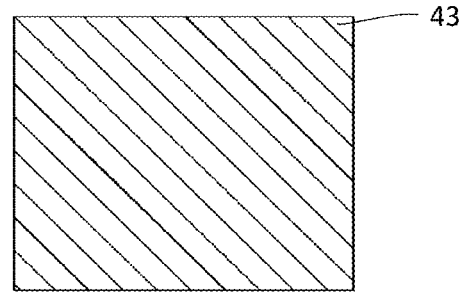
Figure 12C:
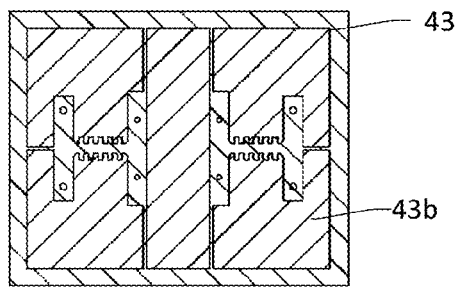
Figure 12D:
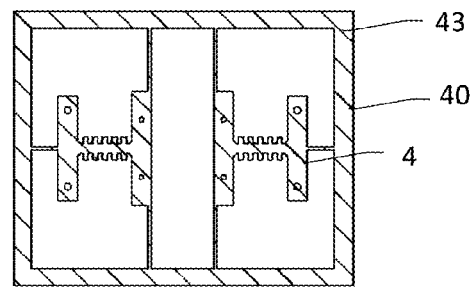
Figure 12E:
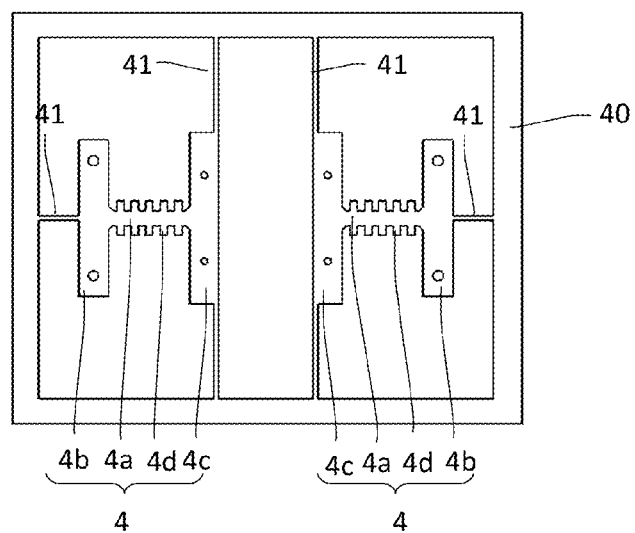

FIG. 11B shows a relationship between the width of the beam 14 and the resonance frequency. It is apparent that the resonance frequency fluctuates by approximately ±10 Hz around 1100 Hz when a variation of 0.98 mm to 0.99 mm is made in the width of the beam. In this case, it is preferable to coarsely regulate the resonance frequency downward by increasing the mass through the addition of the weight and to then perform the fine regulation by decreasing the mass through the laser beam machining or the like.

Figure 7C:
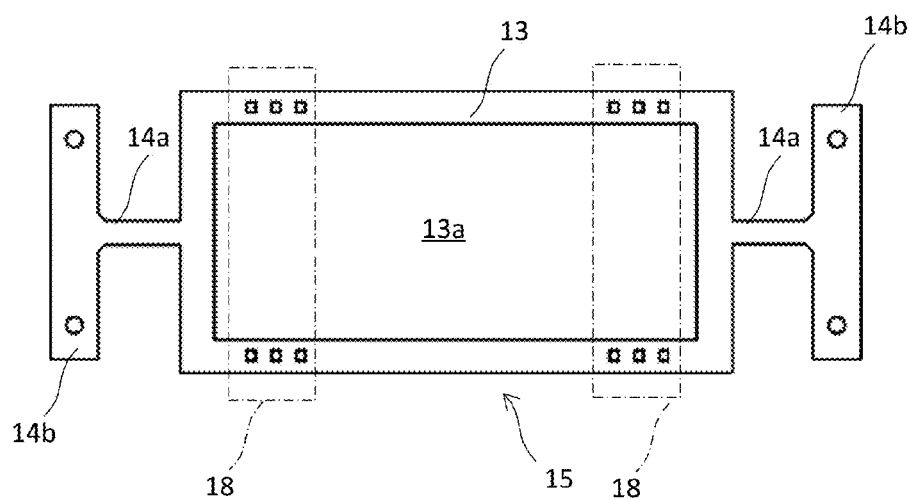
FIG. 7C is an explanatory view showing a mass regulating unit for regulating the resonance frequency of the counter swing member.

In an example of FIG. 7C, the mass regulating unit 18 is provided in an opposed side part forming the opening portion 13$a$ in the counter movable unit 13. FIG. 7C shows an example in which a small rectangle is subjected to deep cutting in a size of 0.2 mm square. The counter beam 14 and the counter movable unit 13 are constituted by the same material. However, there is a fear that the swing characteristic might be changed if the mass regulating unit 18 is provided in the counter beam 14 functioning as the torsional rotation axis. For this reason, it is preferable that the mass regulating unit 18 should be exclusively provided in the counter movable unit 13.

In FIGS. 6C and 7C, the description has been given to an example in which the mass regulating unit for regulating the resonance frequency is provided in the movable unit and/or the counter movable unit and the operation for increasing or decreasing the mass is performed for the mass regulating unit 18 from above or below after the light deflecting device is assembled. For example, in the case where the size of the coil substrate 3$c$ is smaller than the size of the deflecting mirror 3$a$, it is hard to perform processing of the mass regulating unit 18 for regulating the mass after the assembly of the light deflecting device because of the disturbance of the deflecting mirror 3$a$.

Figure 9A:
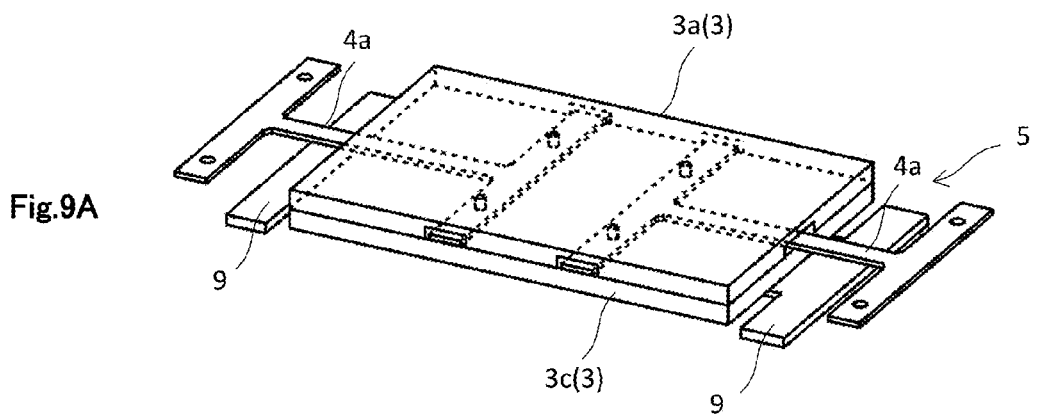
FIG. 9A is an explanatory view showing the light deflecting unit or the counter swing member, illustrating another example.
Figure 9B:
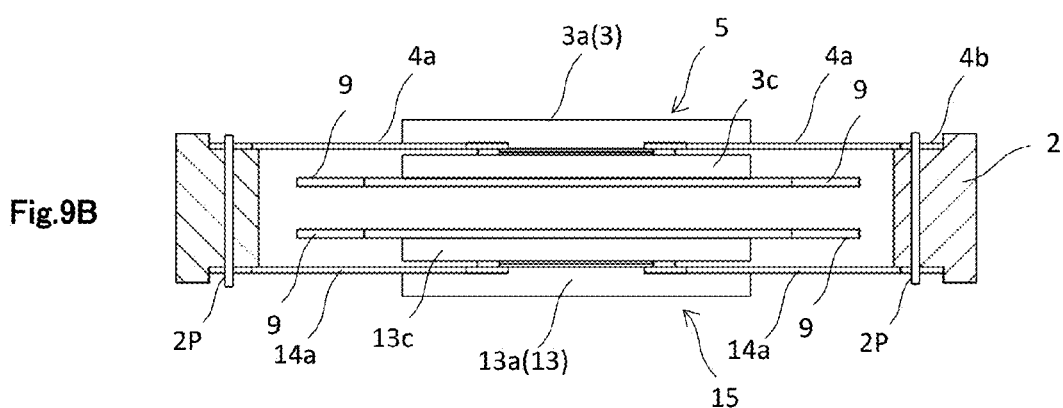
FIG. 9B is a sectional view showing the light deflecting unit and the counter swing member which are attached to the fixed unit, illustrating yet another example.
Figure 9C:
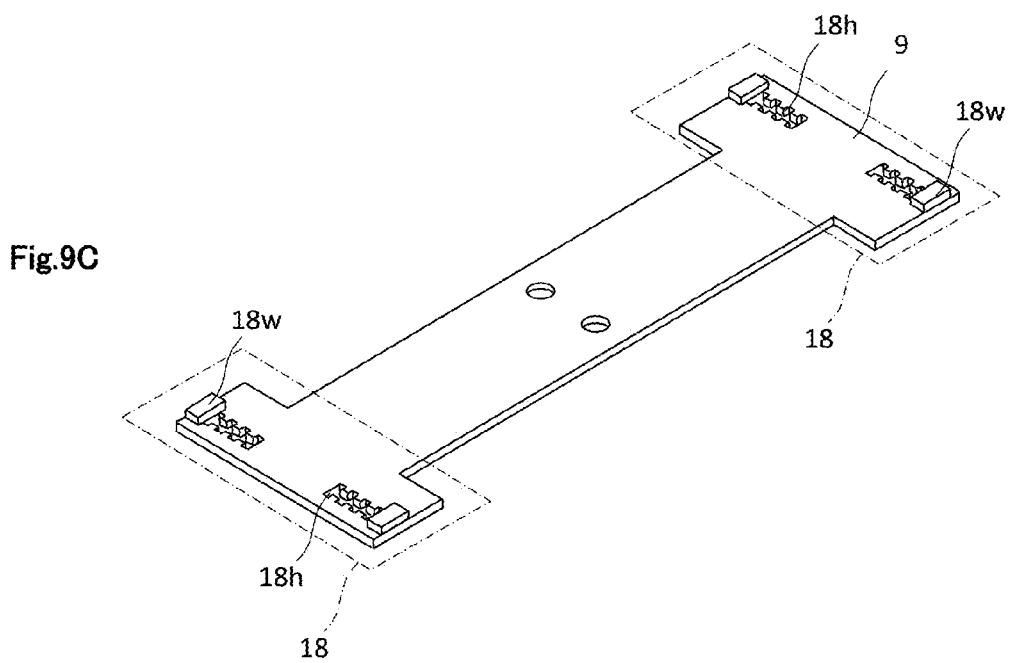
FIG. 9C is an explanatory view showing a mass regulating unit for regulating the resonance frequency of the light deflecting unit or the counter swing member, illustrating yet another example.

FIGS. 9A, 9B and 9C show yet another embodiment which is prepared for this case. It is sufficient to dispose a member 9 for being swung integrally with the movable unit and/or the counter movable unit so as to be exposed into a position where it is not superposed on the deflecting mirror 3$a$ in addition to the movable unit and/or the counter movable unit, and to provide the mass regulating unit 18 in the member 9. As a material of the member 9, it is possible to use the same resin or glass material as that of the movable unit. It is also possible to use other resins.

In other words, it is sufficient to provide the member 9 which can be swung integrally with the movable unit 3 or the counter movable unit 13, and to include the mass regulating unit 18 capable of performing regulation from an outside with the movable unit 3 or the counter movable unit 13 sandwiched. In FIG. 9C, a binder resin measured in a predetermined amount is added as a weight 18$w$ to the mass regulating unit 18, and furthermore, there is shown a punch-out unit 18$h$ in a predetermined size which is formed by laser beam machining.

By employing such a structure that the mass regulating unit is swung integrally with the movable unit or the counter movable unit and can perform regulation from the outside with the movable unit or the counter movable unit sandwiched, it is possible to subsequently regulate a mass for the light deflecting device after the assembly.

The mass regulating unit 18 is provided to regulate the resonance frequency f of the light deflecting unit 5 and the resonance frequency fc of the counter swing member 15 in the assembled light deflecting device 10 respectively for the frequency fi of the driving current which is preset.

As the structure of the beam 4 which efficiently radiates heat generated by internal friction and can be operated stably for a long period of time, a plurality of projections may be formed in extension on the beam 4 in an intersecting direction with a rotation axis.

When the projections are formed in extension, they are displaced in an atmosphere along with the swing of the beam so that convective heat transfer is generated in a flow of wind at this time. By utilizing the phenomenon, it is possible to efficiently radiate heat generated by internal friction along with a torsional operation of the beam. Thus, it is possible to continuously perform the torsional operation stably for a long period of time.

FIGS. 12A to 12E show a procedure for forming a plurality of projections 4$d$ on the beam 4 in the intersecting direction with the rotation axis by the etching method. For example, the projection 4*d* is formed in a width of 0.5 mm, a length of 0.5 mm and a thickness of 0.2 mm.

In the embodiments, the description has been given to an example of the metal elastic member and the miniature machine using the metal elastic member according to the present invention. The technical range of the present invention is not restricted to the description but it is a matter of course that a specific shape, size and pitch of the projection and the like can be set properly within a range in which the functions and effects of the present invention can be produced.

DESCRIPTION OF SYMBOLS

1: miniature machine
2: fixed unit
3: movable unit
4: beam
4*a*: metal bar
4*b*: fixed unit pad
4*c*: movable unit pad
5: light deflecting unit
6: magnetic field forming unit
6*a*, 6*b*: permanent magnet
7: magnetic retainer
10: light deflecting device
13: counter movable unit
14: counter beam
15: counter swing member

The invention claimed is:

1. A light deflecting device comprising:
a light deflecting unit having paired beams provided on both sides of a movable unit having a light reflecting unit and a coil;
a fixed unit to which the light deflecting unit is swingably fixed through the beams;
a magnetic field forming unit disposed on the fixed unit and swinging the movable unit with the beams as torsional rotation axes by an electromagnetic force generated by a driving current flowing to the coil and a magnetic field formed by the magnetic field forming unit; and
a counter swing member provided in the fixed unit so as to be opposed to the light deflecting unit and swung in a reverse phase to a swing phase of the light deflecting unit.

2. The light deflecting device according to claim 1, wherein the counter swing member is configured by a counter movable unit including a counter coil having a winding direction set to be reverse to the coil of the movable unit, and paired counter beams provided on both sides of the counter movable unit, and a driving current is applied to the counter coil in a reverse direction to a direction of the driving current to be applied to the coil.

3. The light deflecting device according to claim 2, wherein a resonance frequency of the light deflecting unit and a resonance frequency of the counter swing member are set to be coincident with each other or close to each other.

4. The light deflecting device according to claim 1, wherein the counter swing member is configured by a counter movable unit and paired counter beams provided on both sides of the counter movable unit, and is swung in an almost reverse phase to a swing phase of the light deflecting unit upon receipt of a stress acting on the fixed unit by swing of the light deflecting unit.

5. The light deflecting device according to claim 4, wherein a frequency of the driving current is set to the vicinity of a resonance frequency of the light deflecting unit, and a resonance frequency of the counter swing member is set to be lower than the frequency of the driving current.

6. The light deflecting device according to claim 2, wherein an opening portion facing the movable unit is formed on the counter movable unit, and a swing cycle of the light deflecting unit can be measured through the opening portion.

7. The light deflecting device according to claim 2, wherein the movable unit and/or the counter movable unit is provided with a mass regulating unit for regulating a resonance frequency.

8. The light deflecting device according to claim 2, wherein there is provided a mass regulating unit configured to be able to swing integrally with the movable unit or the counter movable unit and capable of performing regulation from an outside with the movable unit or the counter movable unit.

9. The light deflecting device according to claim 7, wherein the mass regulating unit is configured to coarsely regulate a resonance frequency by increasing a mass and to finely regulate the resonance frequency by decreasing the mass.

10. The light deflecting device according to claim 8, wherein the mass regulating unit is configured to coarsely regulate a resonance frequency by increasing a mass and to finely regulate the resonance frequency by decreasing the mass.

11. The light deflecting device according to claim 1, wherein the beam and the counter beam are formed to have a sectional area of 1 mm$^2$ or less by any of a focused ion beam method, an etching method and a plating method by using any of metals including a stainless material, a carbon tool steel material and a cold-reduced carbon steel sheet material which are rolled by a tension annealing method.

* * * * *